(12) United States Patent
Noguchi

(10) Patent No.: US 7,081,923 B1
(45) Date of Patent: Jul. 25, 2006

(54) METHOD AND SYSTEM FOR ADJUSTING IMAGE BRIGHTNESS BASED ON COLOR SATURATION COMPONENTS

(75) Inventor: Takafumi Noguchi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/271,259

(22) Filed: Mar. 17, 1999

(30) Foreign Application Priority Data

Mar. 17, 1998 (JP) .................................. 10-066784

(51) Int. Cl.
*H04N 9/64* (2006.01)

(52) U.S. Cl. .................................................... 348/256

(58) Field of Classification Search ............ 348/222.1, 348/223.1, 224.1, 241, 242, 252, 253–256, 348/272, 273, 279, 280, 645, 646; 358/518–523; 382/162, 166, 167; 345/589, 591, 600
See application file for complete search history.

(56) References Cited

U.S. PATENT DOCUMENTS

| | | | | | |
|---|---|---|---|---|---|
| 3,928,867 | A | * | 12/1975 | Lynch | 348/673 |
| 3,953,883 | A | * | 4/1976 | Grewe | 348/645 |
| 5,432,566 | A | * | 7/1995 | Tanaka et al. | 348/645 |
| 5,450,217 | A | * | 9/1995 | Eschbach et al. | 358/518 |
| 5,467,438 | A | * | 11/1995 | Nishio | 345/600 |
| 5,528,388 | A | * | 6/1996 | Tanaka | 358/518 |
| 5,546,125 | A | * | 8/1996 | Tomitaka | 348/169 |
| 5,668,890 | A | * | 9/1997 | Winkelman | 382/167 |
| 5,691,779 | A | * | 11/1997 | Yamashita | 348/645 |
| 5,696,840 | A | * | 12/1997 | Usami | 358/520 |
| 5,943,143 | A | * | 8/1999 | Kawai | 358/520 |
| 5,999,279 | A | * | 12/1999 | Kouzaki et al. | 358/520 |
| 6,034,665 | A | * | 3/2000 | Kim | 345/593 |
| 6,101,272 | A | * | 8/2000 | Noguchi | 382/167 |
| 6,125,199 | A | * | 9/2000 | Sato | 382/162 |
| 6,151,410 | A | * | 11/2000 | Kuwata et al. | 382/162 |
| 6,351,558 | B1 | * | 2/2002 | Kuwata | 382/162 |
| 6,522,432 | B1 | * | 2/2003 | Lin | 358/475 |
| 6,850,272 | B1 | * | 2/2005 | Terashita | 348/223.1 |
| 6,919,924 | B1 | * | 7/2005 | Terashita | 348/223.1 |
| 2002/0094122 | A1 | * | 7/2002 | Matsukubo et al. | 382/165 |

FOREIGN PATENT DOCUMENTS

| | | | |
|---|---|---|---|
| JP | 04078274 | * | 7/1990 |
| JP | 04078274 | * | 3/1992 |
| JP | 06337932 | * | 5/1993 |
| JP | 07-152904 A | | 6/1995 |
| JP | 08-186727 A | | 7/1996 |

* cited by examiner

*Primary Examiner*—David Ometz
*Assistant Examiner*—Jason Whipkey
(74) *Attorney, Agent, or Firm*—Birch, Stewart, Kolasch & Birch, LLP

(57) ABSTRACT

A method for adjusting image brightness is conducted by a system for adjusting image brightness. Digital image data acquired by a data acquisition unit are sent to a lightness computing unit and a color saturation computing unit that compute the lightness L and the color saturation C for every pixel and sends the computed values to a mean value computing unit. The mean value computing unit weights the lightness L by the color saturation C and computes weighted mean values Lm of the lightnesses L. A converter 5 converts the R, G, B color signal components constituting the digital image data S to make the weighted mean values Lm desired values.

20 Claims, 2 Drawing Sheets

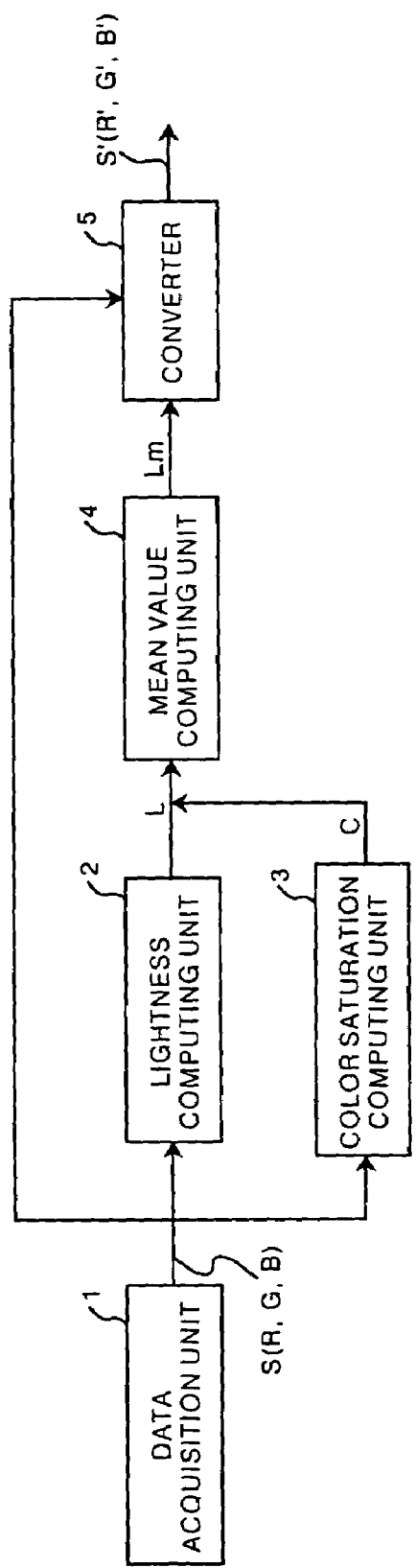

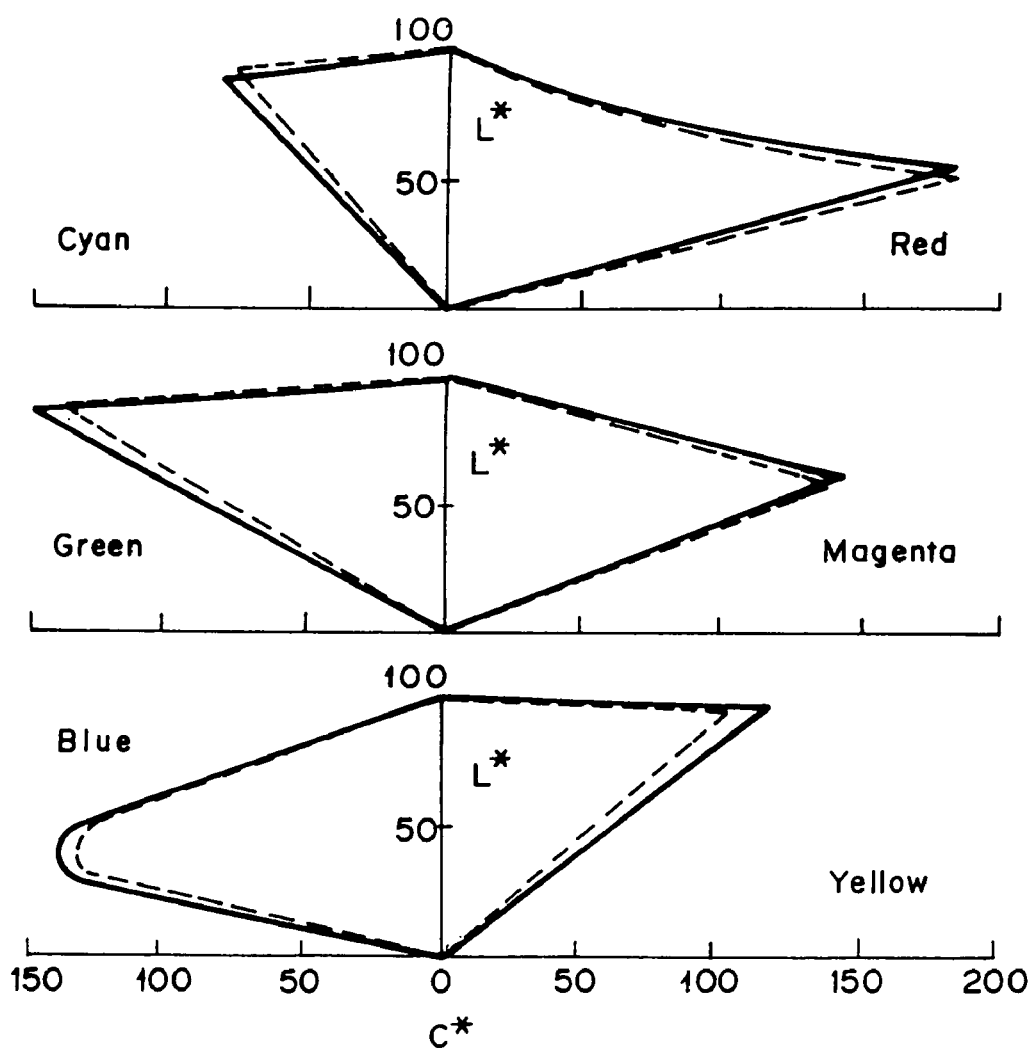

METHOD AND SYSTEM FOR ADJUSTING IMAGE BRIGHTNESS BASED ON COLOR SATURATION COMPONENTS

BACKGROUND OF THE INVENTION

1. Field of the Invention

This invention relates to a method for adjusting image brightness at the time of reproducing an image read from photo film or an image photographed with a digital camera as a photographic print or the like and to a system for implementing the method.

2. Description of the Related Art

One conventional method for adjusting the brightness of an image photographed with a camera or the like is autoexposure (AE). In generally adopted AE, desirable mean picture brightness is assumed to be equivalent to 18% reflectance and the diaphragm aperture and shutter speed of the camera are controlled to make the mean picture brilliance value equivalent to 18% reflectance.

One technique used to improve the exposure accuracy is to divide the picture into multiple regions and determine the final mean brilliance taking the mean values of the individual regions or differences between regions into account (as in center-selective light measurement, valuative light measurement and the like). Some cameras, particularly sophisticated single-lens reflex cameras, enhance exposure accuracy by additionally utilizing an autofocus function to detect the main subject.

The application of such techniques is not limited to the camera side. On the lab printer side, too, it is a common practice to adjust brightness by controlling the number of seconds of exposure when exposing the print paper so as to give the large area transmittance density (LATD) of the negative a print density corresponding to 18% reflectance (i.e., a print density of 0.75).

Since these methods postulate the mean image brightness to be 18% reflectance, however, they encounter problems when, for example, the pictures includes an object of very high or low brightness. Specifically, such objects markedly affect the mean value of the brightness and, as such, cause the image obtained to be excessively light or dark.

SUMMARY OF THE INVENTION

This invention was accomplished in light of the foregoing circumstances and has as one object to provide a method for adjusting image brightness that enables the brightness of an image to be adjusted with high accuracy. Another object of the invention is to provide a system for implementing the method.

FIG. 2 shows the magnitude of the color difference components, i.e., color saturations, of R, G and B (red, green and blue) and C, M and Y (cyan, magenta and yellow) hues in the CIE L*a*b* color representation system. (See R. W. G. Hunt, *The reproduction of colour*, 4th edition, Fountain Press (1987), p 142.) The vertical axis in FIG. 2 is scaled for lightness L but, for convenience, the horizontal axis is scaled for one dimension of the two-dimensional plane of the color difference a*b*, so that $\sqrt{(a^{*2}+b^{*2})}(=c^*)$. The point at which L*=50 in FIG. 2 represents a lightness corresponding to 18% reflectance. For every hue shown in FIG. 2, color saturation is highest in the vicinity of L*=50, i.e., in the vicinity of a lightness of 18% reflectance, and the color saturation is 0 at L*=0, i.e., 0% reflectance, and at L*=100, i.e., 100% reflectance. It can therefore be concluded that a pixel's lightness comes closer to 18% reflectance with increasing color saturation. This invention was accomplished with attention to this fact.

Specifically, in one aspect of the present invention there is provided a method for adjusting image brightness comprising the steps of effecting a computation on color image data represented by a color signal composed of at least three components to obtain pixel lightness components and adjusting brightness of an image represented by the color image data based on the lightness components, the method being characterized in further comprising a step of adjusting the brightness of the image represented by the color image data based on color saturation components of the pixels.

By "color signal composed of at least three components" is meant an RGB, CMY or other such color signal commonly used to represent a color image. When the values of the color signal components are identical, the eye perceives gray.

Specific "lightness components" that can be adopted include, for instance, R, G and B mean values, lightness components based on brilliance, and lightness components that are, for example, the maximum values among the R, G and B values. The present invention is, however, not limited to these lightness components.

The "color saturation components" that can be adopted include, for instance, the ratios or the like between the R, G and B maximum and minimum values. The present invention is, however, not limited to these color saturation components.

In the method for adjusting image brightness according to the present invention, it is preferable to compute weighted lightness components of the pixels by weighting the lightness components of the pixels by the color saturation components of the pixels, compute mean values of the weighted lightness components, and adjust the brightness by converting the color image data to make the mean values desired values.

The "mean values of the weighted lightness components" can be mean values for all pixels, the mean values for only the center portion of the image or the mean values for a specific region among multiple regions into which the image has been divided.

In another aspect of the invention there is provided a system for adjusting image brightness comprising an adjuster having an adjustment unit for effecting a computation on color image data represented by a color signal composed of at least three components to obtain pixel lightness components and adjusting brightness of an image represented by the color image data based on the lightness components, the system being characterized in that the adjuster further comprises an adjustment unit for adjusting the brightness of the image represented by the color image data based on color saturation components of the pixels.

In the system for adjusting image brightness according to the present invention, the adjuster preferably includes a weighted lightness component computing unit for computing weighted lightness components of the pixels by weighting the lightness components of the pixels by the color saturation components of the pixels, a mean value computing unit for computing mean values of the weighted lightness components, and a conversion unit for converting the color image data to make the mean values desired values.

The method and system for adjusting image brightness according to the invention adjust image brightness based on both the lightness components and the color saturation components of the color image data. As shown in FIG. 2, a pixel's lightness comes closer to 18% reflectance with increasing color saturation. This adjustment of image brightness by also taking the value of the color saturation components into account therefore makes it possible to adjust the brightness of the image more accurately than is possible based solely on the lightness components.

Specifically, when the mean values of the lightness components are computed and adjustment is effected to make the mean values those of lightness components equivalent to 18% reflectance, the fact that the mean values are computed using the lightness components weighted by the color saturation components enables computation of mean values whose weighting is proportionally higher for pixels that are closer to $L^*=50$, i.e., that are closer to 18% reflectance. Since the probability of the computed mean values being those of lightness components equivalent to 18% reflectance is therefore enhanced, the brightness of the image can be adjusted with high accuracy by converting the color image data to make the mean values desired values.

BRIEF DESCRIPTION OF THE DRAWINGS

FIG. 1 is a block diagram of a system for adjusting image brightness that is an embodiment of the invention.

FIG. 2 is a diagram showing the relationship between lightness and color saturation (CIE $L^*a^*b^*$ color representation system).

PREFERRED EMBODIMENT OF THE INVENTION

An embodiment of the invention will now be explained with reference to FIG. 1.

FIG. 1 is a block diagram of a system for adjusting image brightness that is an embodiment of the invention. As shown in this figure, this embodiment of the system for adjusting image brightness according to the invention is composed of a data acquisition unit 1 for acquiring color digital image data S, a lightness computing unit 2 for computing the lightnesses L of the individual pixels of the digital image data S, a color saturation computing unit 3 for computing the color saturations C of the individual pixels of the digital image data S, a mean value computing unit 4 for computing the mean values Lm of the lightnesses L as explained later, and a converter 5 for converting the pixels of the digital image data S based on the mean values Lm to obtain converted output image data S'.

The data acquisition unit 1 is, for instance, an interface for connection with a digital camera, a card reader for reading data from a digital camera memory, a media drive for reading data from a CD-R or other such media, or a communication unit for receiving image data (none of which are specifically illustrated). In this embodiment, the color digital image data S are represented as a signal proportional to a power of the subject brilliance.

The operation of this embodiment will now be explained.

The color digital image data S acquired by the data acquisition unit 1 are sent to the lightness computing unit 2. The lightness computing unit 2 computes the lightnesses L of the individual pixels by Equation (1):

$$L=0.1B+0.6G+0.3R \quad (1)$$

where

B, G, R: color signal components of pixels

The method of computing lightness L is not limited to Equation (1). Various other methods of computation can be used such as those of Equations (2) and (3):

$$L=\max(R,G,B) \quad (2)$$

$$L=\text{median}(R,G,B) \quad (3)$$

where max (x, y, z): maximum value of x, y, z median: (x, y, z): intermediate value of x, y and z The digital image data S are also sent to the color saturation computing unit 3, which computes the color saturations C of the individual pixels by Equation (4):

$$C=\max(R,G,B)/\min(R,G,B) \quad (4)$$

where min (x, y, z): minimum value of x, y, z

The computed lightnesses L and color saturations C are sent to the mean value computing unit 4, which computes weighted mean values Lm of the lightnesses of the pixels based on Equation (5):

$$Lm=\Sigma(L(x,y)\cdot C(x,y)/\Sigma C(x,y) \quad (5)$$

where

L (x, y): lightness L at pixel (x, y)

C (x, y): color saturation C at pixel (x, Y)

Σ: sum for all pixels

When the hues are represented in the CIE $L^*a^*b^*$ color representation system as shown in FIG. 2, the point at which $L^*=50$ corresponds to 18% reflectance and color saturation C is highest in the vicinity of $L^*=50$, i.e., in the vicinity of 18% reflectance. Therefore, the weighting of the lightnesses L by the color saturations C based on Equation (5) enables computation of mean values Lm whose weighting is proportionally higher for pixels that have larger color saturations C, i.e., that are closer to 18% reflectance. The computed mean values Lm therefore more appropriately represent the lightness at 18% reflectance.

The weighted mean values Lm computed by the mean value computing unit 4 are sent to the converter 5, which converts the brightnesses of the color signal components of the pixels based on Equation (6) below. Equation (6) converts the R, G, B color signal components of the pixels so that a pixel value of 18% reflectance becomes 118.

$$\begin{bmatrix} B' \\ G' \\ R' \end{bmatrix} = 118/Lm \begin{bmatrix} B \\ G \\ R \end{bmatrix} \quad (6)$$

The thus-obtained digital image data S' are sent to a printer, monitor or other such reproduction means to be reproduced as a visible image.

Thus, in this embodiment of the invention, the lightnesses L are weighted by the color saturations C to compute the mean values Lm as shown by Equation (5), the weighted mean values Lm are made values to produce 18% reflectance, and the R, G, B color signal components are converted in accordance with Equation (6) to make the mean values Lm the desired value 118. The R, G, B signal components are thus converted to desired values using values that appropriately represent the lightnesses at 18% reflectance. The brightness of the image can therefore be adjusted with high accuracy. When digital image data S' obtained in accordance with Equation (6) were reproduced using a Frontier printer (product of Fuji Photo Film Co., Ltd.), images visually perceived to have good brightness were obtained.

The embodiment explained in the foregoing treats the digital image data S as a signal proportional to a power of the subject brilliance. However, when the digital image data S are acquired by reading developed film with a film scanner, for example, the digital image data S are represented as log values. In this case, the lightness L can be computed using and of Equations (1)–(3), but the color saturation C is computed using Equation (4'):

$$C = \max(R,G,B) - \min(R,G,B) \qquad (4')$$

On the other hand, the conversion of the R, G, B color signal components is effected based on Equation (7):

$$\begin{bmatrix} B' \\ G' \\ R' \end{bmatrix} = \begin{bmatrix} 118 & - & Lm \\ 118 & - & Lm \\ 118 & - & Lm \end{bmatrix} + \begin{bmatrix} B \\ G \\ R \end{bmatrix} \qquad (7)$$

Images were read into a Frontier scanner from exposed and developed Super G ACE400 color negative film and the recorded image data were converted in accordance with Equation (7). When the so-obtained digital image data S' were reproduced using a Frontier printer, prints visually perceived to have good brightness were obtained. (The scanner, film and printer were products of Fuji Photo Film Co., Ltd.)

The embodiment explained in the foregoing computes the mean values Lm for all pixels of the image represented by the digital image data S. The invention is not limited to this, however, and, for example, it is instead possible to divide the whole image into regions and compute the mean values for each region or to compute the mean values only for a region corresponding to the center portion of the whole image.

What is claimed is:

1. A method for adjusting image brightness comprising the steps of:
    effecting a computation on color image data represented by a color signal composed of at least three components to obtain pixel lightness components and an average brightness of an image;
    adjusting brightness of the image represented by the color image data based on the lightness components; and
    adjusting the brightness of the image represented by the color image data based on the average brightness of the image,
    wherein the average brightness of the image is adjusted with color saturation components of the pixels, and
    wherein the step of adjusting the brightness of the image represented by the color image data based on color saturation components of the pixels is effected by computing weighted lightness components by weighting the lightness components of the pixels by the color saturation components of the pixels, computing mean values of the weighted lightness components, and adjusting the brightness by converting the color image data to make the mean values desired values.

2. The method of claim 1, wherein the average brightness of the image is obtained by any one of the following:
    averaging the color saturation components of the pixels to obtain an average color saturation value, adjusting the lightness components of the image based on the average color saturation value to obtain an average lightness value, and designating the average lightness value as the average brightness of the image;
    averaging the color saturation components of the pixels to obtain the average color saturation value, selecting pixels to be used to calculate the average lightness value based on the average color saturation value, averaging the lightness values of the selected pixels to obtain the average lightness value, and designating the average lightness value as the average brightness of the image; and
    averaging and obtaining a variance of the color saturation components of the pixels to obtain the average color saturation value and the variance, selecting pixels to be used to calculate the average lightness value based on the average color saturation value and the variance, averaging the lightness values of the selected pixels to obtain the average lightness value, and designating the average lightness value as the average brightness of the image.

3. A system for adjusting image brightness comprising an adjuster having an adjustment unit configured for effecting a computation on color image data represented by a color signal composed of at least three components to obtain pixel lightness components and an average brightness of an image and adjusting brightness of the image represented by the color image data based on the lightness components, the system being characterized in that the adjustment unit is further configured for adjusting the brightness of the image represented by the color image data based on the average brightness of the image, wherein the average brightness of the image is adjusted with color saturation components of the pixels,
    wherein the adjuster includes weighted lightness component computing means for computing weighted lightness components of the pixels by weighting the lightness components of the pixels by the color saturation components of the pixels, mean value computing means for computing mean values of the weighted lightness components, and conversion means for converting the color image data to make the mean values desired values.

4. The system of claim 3, wherein the adjustment unit is configured to obtain the average brightness of the image is by any one of the following:
    averaging the color saturation components of the pixels to obtain an average color saturation value, adjusting the lightness components of the image based on the average color saturation value to obtain an average lightness value, and designating the average lightness value as the average brightness of the image;
    averaging the color saturation components of the pixels to obtain the average color saturation value, selecting pixels to be used to calculate the average lightness value based on the average color saturation value, averaging the lightness values of the selected pixels to obtain the average lightness value, and designating the average lightness value as the average brightness of the image; and
    averaging and obtaining a variance of the color saturation components of the pixels to obtain the average color saturation value and the variance, selecting pixels to be used to calculate the average lightness value based on the average color saturation value and the variance, averaging the lightness values of the selected pixels to obtain the average lightness value, and designating the average lightness value as the average brightness of the image.

5. A device for adjusting brightness of an image, comprising:
a data acquisition unit configured to acquire image data of the image; and
an adjustment unit configured to adjust a brightness of the image based on an average brightness of the image, wherein the average brightness of the image is adjusted with a color saturation of the image data from said data acquisition unit,
wherein the adjustment unit comprises:
a lightness computing unit configured to compute lightness of the image data;
a color saturation computing unit configured to compute color saturation of the image data;
a mean value computing unit configured to compute mean values of the lightness computed by the lightness computing unit based on the colour saturation computed by the color saturation unit; and
a converting unit configured to convert the brightness of the image data based on the mean values computed by the mean value computing unit.

6. The device of claim 5, wherein:
the lightness computing unit is configured to compute the lightness of the image data on an individual pixel basis;
the color saturation computing unit is configured to compute color saturations of the individual pixels; and
the converting unit is configured to convert the brightness of the image data on individual pixel basis.

7. The device of claim 5, wherein the converting is configured to achieve a predetermined brightness reflectance value.

8. The device of claim 7, wherein the predetermined brightness reflectance value is substantially 18%.

9. The device of claim 5, wherein the lightness computing unit is configured to determine lightness on the basis of at least one of mean values of individual color components, maximum values of individual color components, and brilliance of individual color components.

10. The device of claim 5, wherein the color saturation computing unit is configured to determine color saturation on the basis of at least one of ratios between maximum individual color components and minimum individual color components and the differences between maximum individual color components and the minimum individual color components.

11. The device of claim 5, wherein the mean value computing unit is configured to determine mean values on the basis of at least one of a whole image, a center portion of the image, and one or more specific regions of the image.

12. The system of claim 5, wherein the adjustment unit is configured to obtain the average brightness of the image is by any one of the following:
averaging the color saturation components of the pixels to obtain an average color saturation value, adjusting the lightness components of the image based on the average color saturation value to obtain an average lightness value, and designating the average lightness value as the average brightness of the image;
averaging the color saturation components of the pixels to obtain the average color saturation value, selecting pixels to be used to calculate the average lightness value based on the average color saturation value, averaging the lightness values of the selected pixels to obtain the average lightness value, and designating the average lightness value as the average brightness of the image; and
averaging and obtaining a variance of the color saturation components of the pixels to obtain the average color saturation value and the variance, selecting pixels to be used to calculate the average lightness value based on the average color saturation value and the variance, averaging the lightness values of the selected pixels to obtain the average lightness value, and designating the average lightness value as the average brightness of the image.

13. A method for adjusting brightness of an image, comprising:
acquiring image data of the image; and
adjusting a brightness of the image based on an average brightness of the image, wherein the average brightness of the image is adjusted with a color saturation of the image data, wherein the adjusting step comprises:
computing lightness of the image data;
computing color saturation of the image data;
computing mean values of the lightness of the image data; and
converting the brightness of the image data based on the mean values of the lightness of the image data.

14. The method of claim 13, wherein:
the computing lightness step comprises computing the lightness of the image data on individual pixel basis;
the computing color saturation step comprises computing color saturations of the individual pixels; and
the converting step comprises converting the brightness of the image data on individual pixel basis.

15. The method of claim 13, wherein the converting step comprises converting to achieve a predetermined brightness reflectance value.

16. The method of claim 15, wherein the predetermined brightness reflectance value is substantially 18%.

17. The method of claim 13, wherein the computing the lightness step comprises at least one of:
determining mean values of individual color components;
determining maximum values of individual color components; and
determining brilliance of individual color components.

18. The method of claim 13, wherein the computing color saturation step comprises at least one of:
determining ratios between maximum individual color components and minimum individual color components; and
determining the differences between maximum individual color components and the minimum individual color components.

19. The method of claim 13, wherein the computing the mean values step comprises at least one of:
determining mean values on an entirety of the image;
determining mean values on a center portion of the image; and
determining mean values on one or more specific regions of the image.

20. The method of claim 13, wherein the average brightness of the image is obtained by any one of the following:
averaging the color saturation components of the pixels to obtain an average color saturation value, adjusting the lightness components of the image based on the average color saturation value to obtain an average lightness value, and designating the average lightness value as the average brightness of the image;
averaging the color saturation components of the pixels to obtain the average color saturation value, selecting pixels to be used to calculate the average lightness value based on the average color saturation value, averaging the lightness values of the selected pixels to obtain the average lightness value, and designating the average lightness value as the average brightness of the image; and averaging and obtaining a variance of the color saturation components of the pixels to obtain the average color saturation value and the variance, selecting pixels to be used to calculate the average lightness value based on the average color saturation value and the variance, averaging the lightness values of the selected pixels to obtain the average lightness value, and designating the average lightness value as the average brightness of the image.

* * * * *